(12) United States Patent
Sasaki et al.

(10) Patent No.: US 6,724,955 B2
(45) Date of Patent: Apr. 20, 2004

(54) ADD-DROP MULTIPLEXER WITH SIGNAL AMPLIFICATION ABILITY

(75) Inventors: Yutaka Sasaki, c/o Department of Systems Engineering, Faculty of Engineering, Ibaraki University, 4-12-1 Nakanarusawa-cho, Hitachi, Ibaraki (JP); Hirohisa Yokota, Ibaraki (JP); Yoshitaka Satoda, Hitachi (JP)

(73) Assignees: Yutaka Sasaki, Ibaraki (JP); Toyokuni Electric Cable Co., Ltd., Tokyo (JP)

( * ) Notice: Subject to any disclaimer, the term of this patent is extended or adjusted under 35 U.S.C. 154(b) by 0 days.

(21) Appl. No.: 09/854,758

(22) Filed: May 14, 2001

(65) Prior Publication Data

US 2003/0035616 A1 Feb. 20, 2003

(30) Foreign Application Priority Data

May 16, 2000 (JP) ........................ 2000-183723

(51) Int. Cl.⁷ .............................. G02B 6/293; G02B 6/34
(52) U.S. Cl. ............................... 385/24; 385/37; 385/43; 385/47
(58) Field of Search .................. 385/15–24, 31, 385/37, 43, 47, 48

(56) References Cited

U.S. PATENT DOCUMENTS

| | | | | |
|---|---|---|---|---|
| 5,459,801 A | * | 10/1995 | Snitzer | 385/30 |
| 5,638,473 A | * | 6/1997 | Byron | 385/37 |
| 5,701,194 A | * | 12/1997 | Meli et al. | 359/341.1 |
| 5,805,751 A | * | 9/1998 | Kewitsch et al. | 385/43 |
| 5,917,969 A | * | 6/1999 | Gavrilovic et al. | 385/15 |
| 6,288,834 B1 | * | 9/2001 | Sugaya et al. | 359/341.1 |
| 6,374,019 B1 | * | 4/2002 | Gustavsson | 385/42 |
| 6,388,806 B1 | * | 5/2002 | Freeman et al. | 359/341.3 |
| 6,400,499 B2 | * | 6/2002 | Sugaya et al. | 359/341.42 |
| 6,498,799 B1 | * | 12/2002 | Shevy et al. | 372/6 |

FOREIGN PATENT DOCUMENTS

JP       11271558 A    *  10/1999    ........... G02B/6/293

* cited by examiner

*Primary Examiner*—Akm Enayet Ullah
*Assistant Examiner*—Michelle R. Connelly-Cushwa
(74) *Attorney, Agent, or Firm*—Jordan and Hamburg LLP

(57) ABSTRACT

Grating built-in type optical fiber couplers and optical amplifiers form a multiplexer for efficiently effecting multiplex separation of a specific wavelength without using an optical circulator. A function to add a signal of specific wavelength efficiently can be realized. Additionally, the device is inexpensive.

8 Claims, 7 Drawing Sheets

PRIOR ART

ADD-DROP MULTIPLEXER WITH SIGNAL AMPLIFICATION ABILITY

BACKGROUND OF THE INVENTION

The present invention is related to an optical coupler using a grating filter in which a grating (periodic perturbation of refractive index) is formed in a core of an optical fiber and a portion adjacent the core.

The present invention contributes in the field of optical communications. It is useful technology when only specific wavelength is separated out or added in wavelength multiplex transmission.

A conventional optical transmission type filter is described below.

Since it is generally common for the transmission optical filter to be required in the field of optical communications, an optical fiber grating filter is used in combination with optical parts including an optical circulator in order to transmit a predetermined wavelength band. FIG. 8 illustrates a schematic diagram of an optical fiber grating filter 22. Moreover, FIG. 9 illustrates the general reflective properties of the optical fiber grating filter 22. The optical fiber grating filter 22 formed in an optical fiber 21 is a filter of a reflection type which reflects light of a predetermined wavelength, allows transmission of other wavelengths, and is excellent in wavelength selection properties for narrow band use, and has little insertion loss. Although a usual reflective bandwidth is approximately 1 nm, if a special process is used, it can also realize a reflective bandwidth of 0.2 mm to 10 mm.

FIG. 10 illustrates an example an optical transmission filter formed by combining an optical fiber grating filter 32 and optical circulator 33 in the course of an optical fiber 31. Although a signal incident from a port 1 is. outputted to a port 2 if the optical fiber grating filter 32 is formed on the route to the port 2, only a specific wavelength (it is called wavelength λB hereupon) is reflected and outputted from a port 3 after it returns back to the optical circulator 33 side. If two or more signals by which wavelength multiplex is carried out from the port 1, only a signal corresponding to wavelength λB will be outputted from the port 3 and all the signals corresponding to other wavelength will be outputted from the port 2. That is, the multiplex separation of the signal of specific wavelength LB can be carried out.

Moreover, FIG. 11 illustrates optical transmission filter formed by combining an optical fiber grating filter 42 and an optical fiber coupler 43 in the course of an optical fiber 41. In this example, the signal inputted from the port 1 is outputted to the ports 3 and 4 by halves by the optical fiber coupler 43. At the port 3 the signal is reflected by the optical fiber grating filter 42 and the signal corresponding to wavelength λB reinputs to the optical fiber coupler 43, and is outputted to the ports 1 and 2 by halves again. Therefore, one fourth of the inputted signals will be outputted in the port 2. If two or more signals are inputted to the port 1 by which wavelength multiplex is done, only the signal corresponding to wavelength λB will be outputted from the port 2, and all the signals corresponding to other wavelength will be outputted from the port 3.

In addition, FIG. 12 shows a grating filter 52 formed in extension part of an optical fiber coupler 53 which functions as an optical transmission filter in the course of an optical fiber 51. In this example, a signal input to port 1 of the optical fiber coupler 53 is reflected by a grating filter 52 is formed in an extension portion of the optical fiber coupler 53, if the signal is of specific wavelength λB, and will be outputted to the port 2. In this case, if two or more signals by which wavelength multiplex is done are inputted, the signal corresponding to the wavelength λB is outputted to the port 2, all signal corresponding to another wavelength is outputted to the port 4 and the multiplex separation of the signal of specific wavelength λB can be done.

The problem in the above-mentioned conventional technology is as follows.

At first, in the method shown in FIG. 10, in case of using the combination of the optical fiber grating filter 32 and the optical circulator 33, although the insertion loss is in approximately 2 dB between the port 1 and port 2, it is excelled in properties, the problem is that the optical circulator 33 is expensive. Moreover, in the method shown in FIG. 11 by the combination of the optical fiber grating filter 42 and optical fiber coupler 43, if the optical fiber coupler 43 is compared with the optical circulator 33, although it is a cheap device, as for insertion loss, the minimum is 6 dB (namely, ¼). Furthermore, a signal outputted from the port 3 has an insertion loss of 3 dB (namely, ½).

Furthermore, by the combination of the optical fiber grating filter 52 and optical fiber coupler 53 shown in FIG. 12, the signal of specific wavelength λB that is outputted from the port 2 to the port 1 and 4, the signal of specific wavelength λB outputted has a 0.4 dB (namely, 9/10) insertion loss.

SUMMARY OF THE INVENTION

In light of the forgoing, a multiplexer has a grating built-in type optical coupler and an optical amplifier, and effects not only multiplex separation of a signal but addition of a specific wavelength, and the excitation light which became unnecessary can be removed effectively and it is enabled to suppress a fall of the signal light efficiency. Furthermore, since the device does not use optical parts, such as the above-mentioned optical circulator, and is formed by an optical fiber, transmission is good. Accordingly it is an object of the present invention to provide an inexpensive wavelength multiplex transmission system having a low insertion loss.

According to the invention, there is provided an add-drop multiplexer with signal amplification ability, comprising two optical couplers of a grating built-in type with the two same structures and two optical amplifiers.

Moreover, the optical coupler of the grating built-in type of the present invention including molten extended portion of fiber coupler formed as a fiber grating, the pitch of the grating is a uniform structure in the length direction, apodization is carried out, and grating length is 2.0 mm and change in induced refractive index is 0.001. Here, apodization uses a window function for induced refractive index change of grating in the length direction of an optical fiber as shown in FIG. 13.

DETAILED DESCRIPTION

Preferred embodiments of the present invention are described in more detail below referring to the accompanying drawings.

Figure 1:
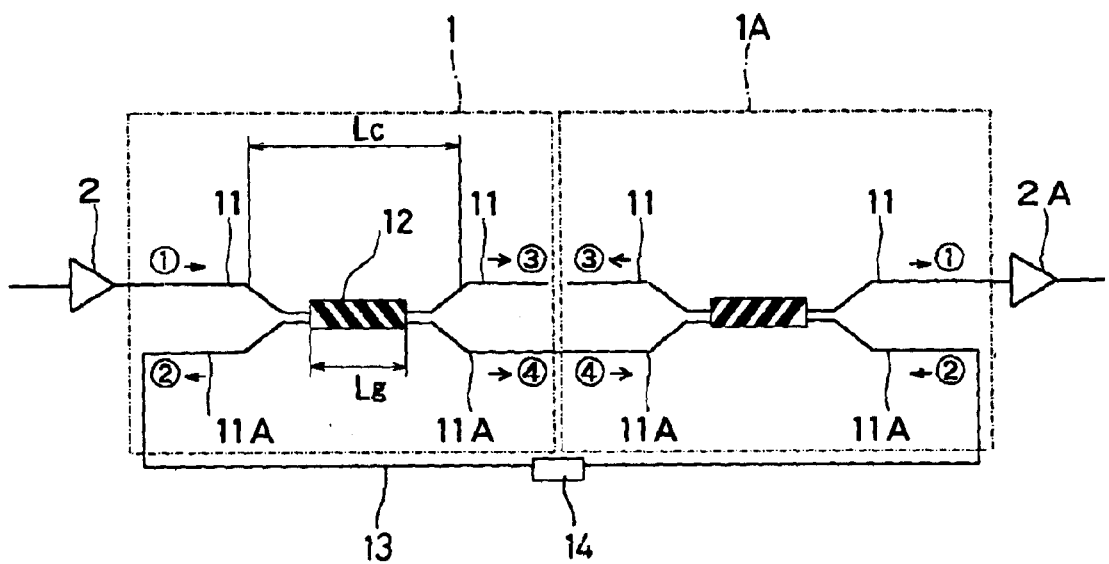
FIG. 1 shows a first embodiment of the present invention.

FIG. 1 illustrates an example of a first embodiment of the present invention. A multiplexer comprises first optical coupler 1 of the grating built-in type on an input side of the multiplexer and an optical amplifier 2 having an output connected to one of through optical fibers 11. A second optical coupler 1A of a grating built-in type is on an output side of the multiplexer and includes a coupled optical fiber 11A connected to a coupled optical fiber 11A on an output side of the optical coupler 1 on the input side. The through optical fibers 11 of couplers 1 and 1A are not connected to each other. A second optical amplifier 2A on an output side receives input from the through optical fiber 11 of the second optical coupler 1A. An optical fiber 13 connects ports of the coupled optical fibers through a switch 14 so as to output Bragg wavelength separated by the optical fiber 11A of the first optical coupler to other coupled optical fiber 11 A on the output side of the second optical coupler 1A.

In addition, means for inputting another Bragg wavelength maybe provided at the optical fibers 11A on an output side of other optical coupler 1A. In FIG. 1, the signal light inputted from a left side is amplified with the optical amplifier 2, inputted into the port 1 of the optical fiber grating coupler 1 (left). Subsequently, only signal light corresponding to a Bragg wavelength of a grating of the coupler 1 is outputted by the port 2, and the other signal light is outputted to the port 4. Next, the outputted signal light optical is inputted into the port 4 of the grating coupler (right) 1A provided symmetrically as compared to the left optical fiber grating coupler 1, and is further outputted to a port 1. Moreover, signal light corresponding to the Bragg wavelength is combined from the port 2, and is outputted to the port 1. Therefore, all signal light becomes together, is again amplified by the optical amplifier of an output end, and acts to the main line. Then the excitation light used for each optical amplifier at this time outputs to the port 3 of the optical fiber grating coupler, and decreases.

Figure 2:
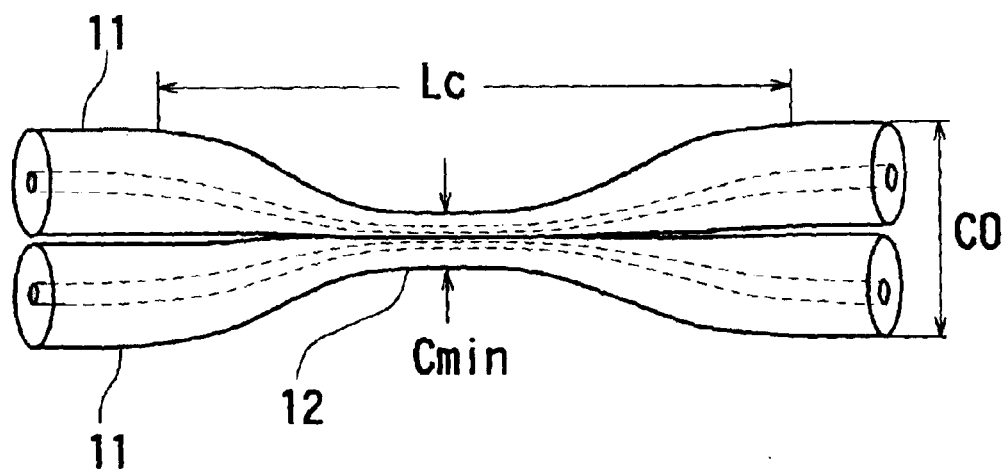
FIG. 2 is a side view of a tapered optical fiber coupler showing the first embodiment of the present invention.
Figure 3:
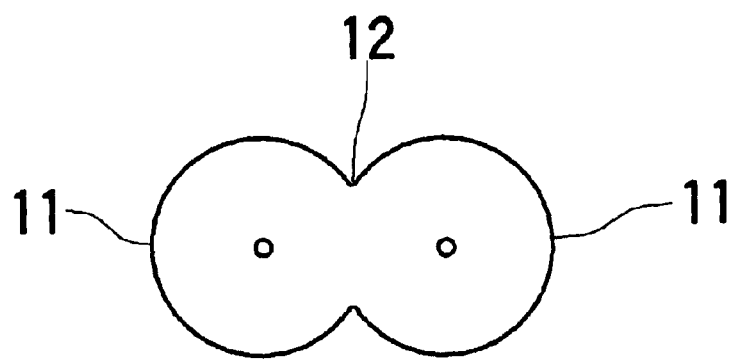
FIG. 3 is a sectional view of an optical fiber coupler melted and extended which is used in the first embodiment of the present invention.

FIG. 2 illustrates a side view of an optical fiber coupler formed in a shape of a taper form and FIG. 3 illustrates a sectional view of the optical fiber coupler having a molten extended portion. The numeral 11 shows an optical fiber; the numeral 12 is a filter having optical fiber grating; the mark of CO shows the width of two optical fibers without melting and extending; the mark of Cmin shows a width of the thinnest portion of optical fiber coupler which is molten-extended; Lc is a length of the taper portion of optical fiber coupler which is molten-extended (the length of the portion is not greater than 0.9 CO hereupon); and Lg is a length of the grating. Also it sets the ratio of CO and Cmin to extension ratio τ.

The method of producing the optical coupler of a grating built-in type shown in FIG. 1 is described as follows. At first, melting and extending of the two optical fibers 11 is carried out by the heating molten-extended method, and the optical fiber coupler is produced. Next, the formation position of the grating is determined. In this invention, the grating shall be symmetrically formed to the center of a taper part. Using the double luminous flux holographic interferometry or the phase mask method, the formation method of grating irradiates violet rays with a wavelength of about 244 nm from the side, and builds the stripes of irradiation light by interference. Since the induced refractive index of an optical fiber core part changes according to the intensity of violet rays, a grating is formed. In this embodiment, since the target signal wavelength is the 1.55 μm band, the pitch of interference fringes could be approximately 0.5 μm.

Figure 4:
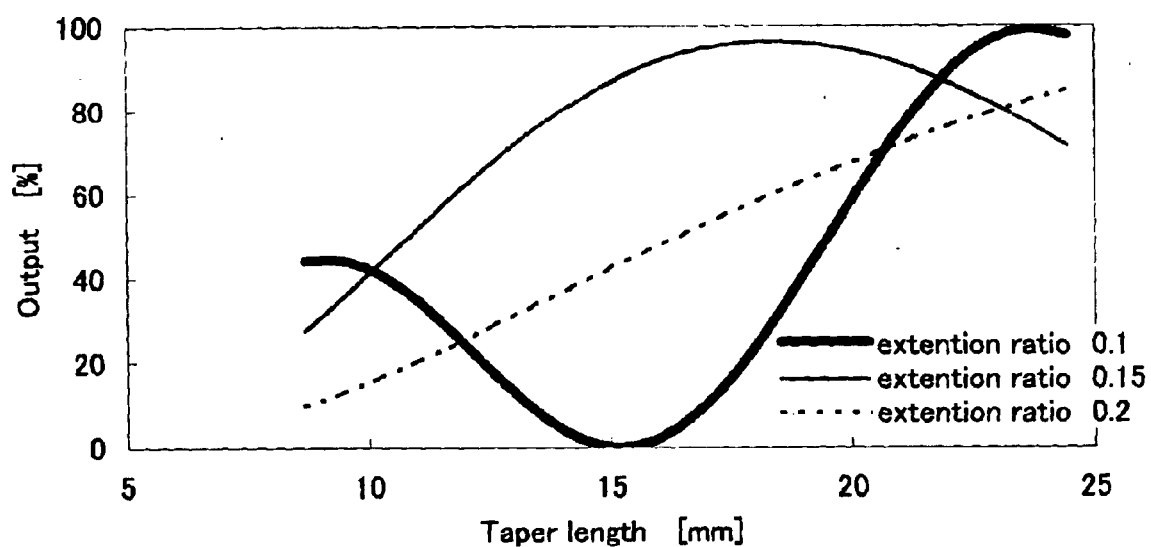
FIG. 4 is a graph showing output power properties of Bragg wavelength to a port 2 of the first embodiment of the present invention.
Figure 5:
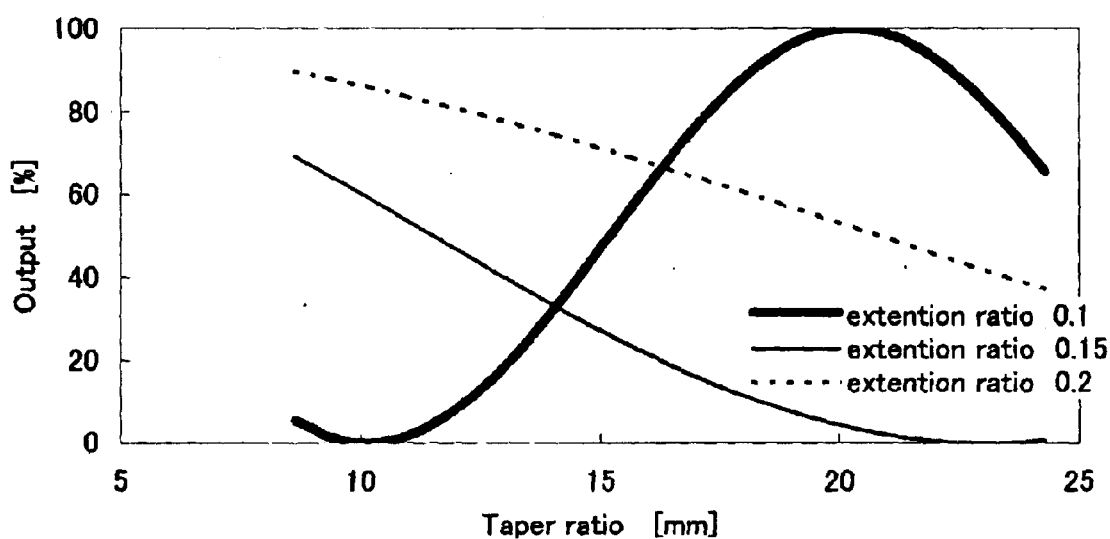
FIG. 5 is a graph showing output power properties of exited light wavelength to a port 3 of the first embodiment of the present invention.

First, it is the optical fiber to which the used optical fiber 11 has Ge (Germanium) added to the core, and germanium and F (Fluorine) to the cladding in production of the optical fiber coupler. The refractive index of the core and cladding of the optical fiber 11 are 1.4624 and 1.4580, respectively. The optical fiber coupler produced is a coupler with wavelength dependability, for example, when the signal of wavelength the band of 1.55 micrometers is inputted from the port 1 shown in FIG. 1, it is outputted to the port 4. The length Lc of the taper portion of the optical fiber coupler is approximately 20 mm. If the grating has a length of 2 mm, and an extension ratio is 0.1, 0.15 and 0.2, in 15 and 0.2, the optical coupler of the grating built-in type is produced while the length of the taper of optical fiber coupler is changed. At this time, induced refractive index change is set to 0.001. In each situation, the output efficiency of Bragg wavelength to the port 3 is shown in FIG. 4, and the excitation light is shown in FIG. 5 for the output efficiency to the port 2. The Bragg wavelength is set to 1.545 μm and the wavelength of excitation light wavelength is set to 0.98 μm.

Figure 6:
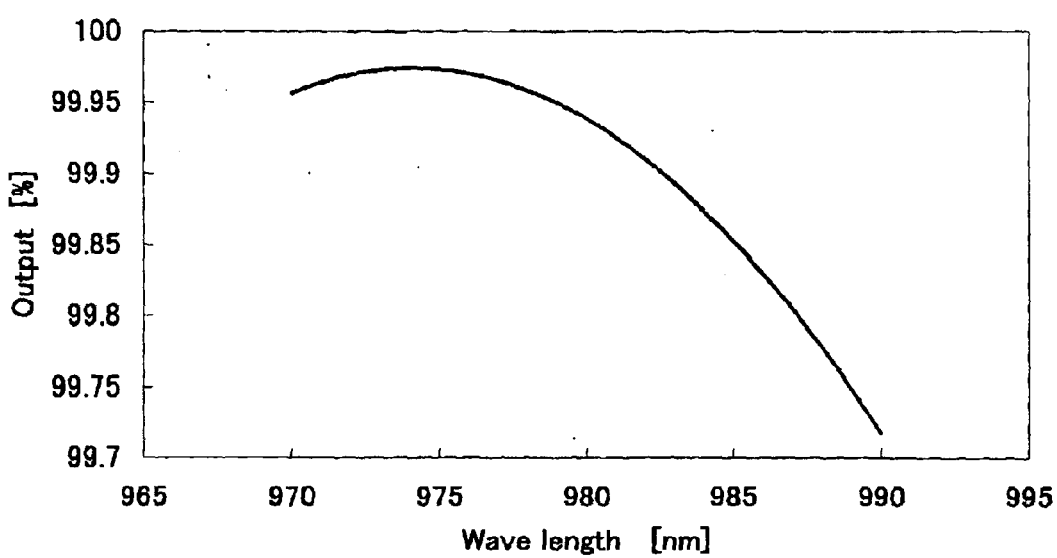
FIG. 6 is a graph showing properties in output wavelength (extension rate: 0.1; length of tapered portion: 20.5 mm; and band of wavelength: 0.98 m) in the first embodiment of the present invention.
Figure 7:
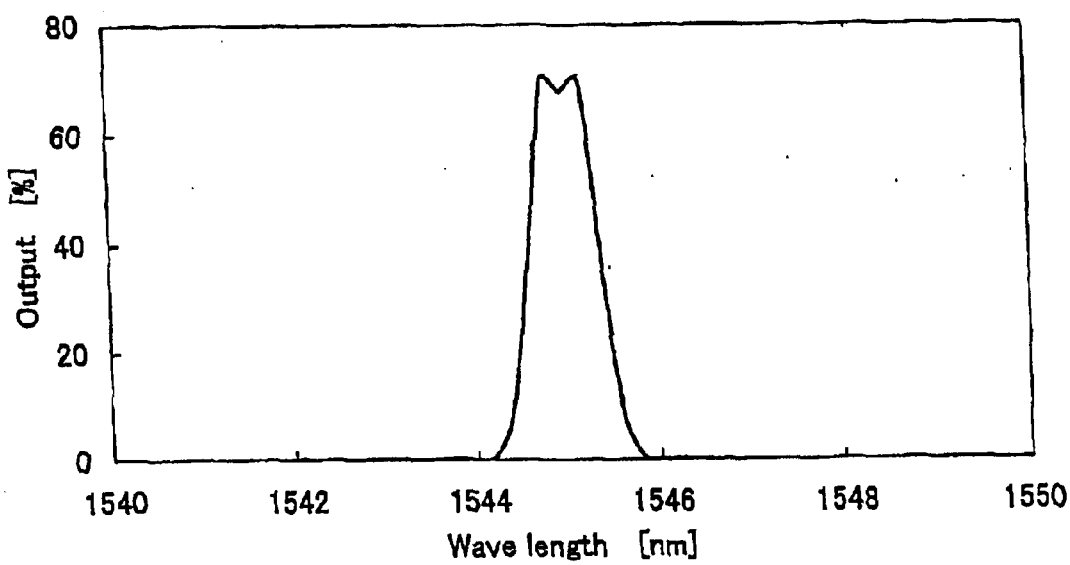
FIG. 7 is a graph showing properties in output wavelength (extension rate: 0.1; length of tapered portion: 20.5 mm; and band of wavelength: 1.55 μm) in the first embodiment of the present invention.
Figure 8:
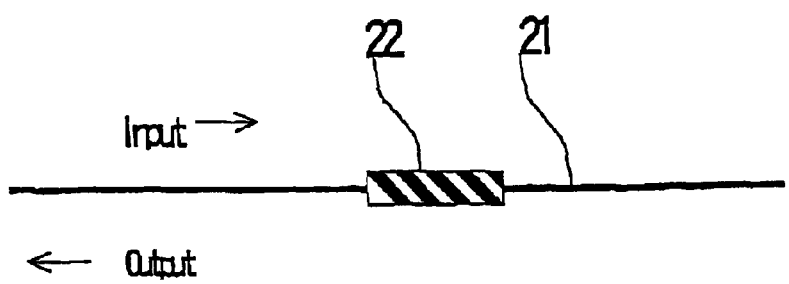
FIG. 8 is a schematic view of a conventional optical fiber grating filter.
Figure 9:
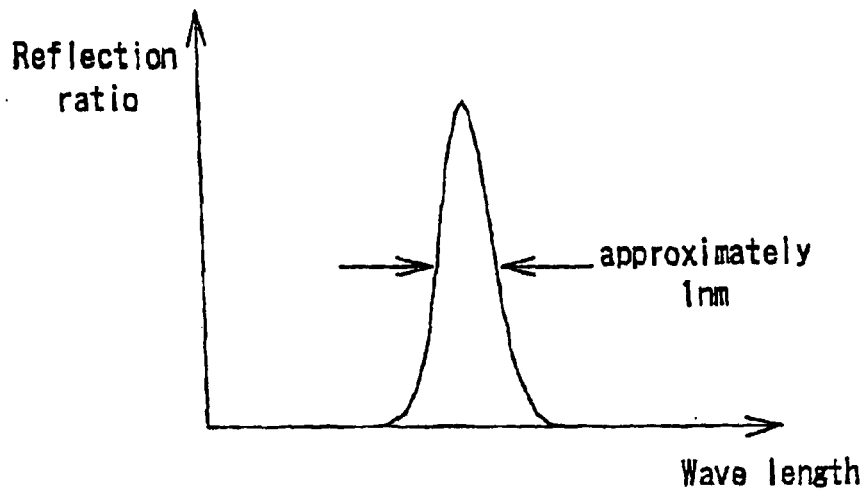
FIG. 9 is a graph showing reflecting properties of a conventional optical fiber grating filter.
Figure 10:
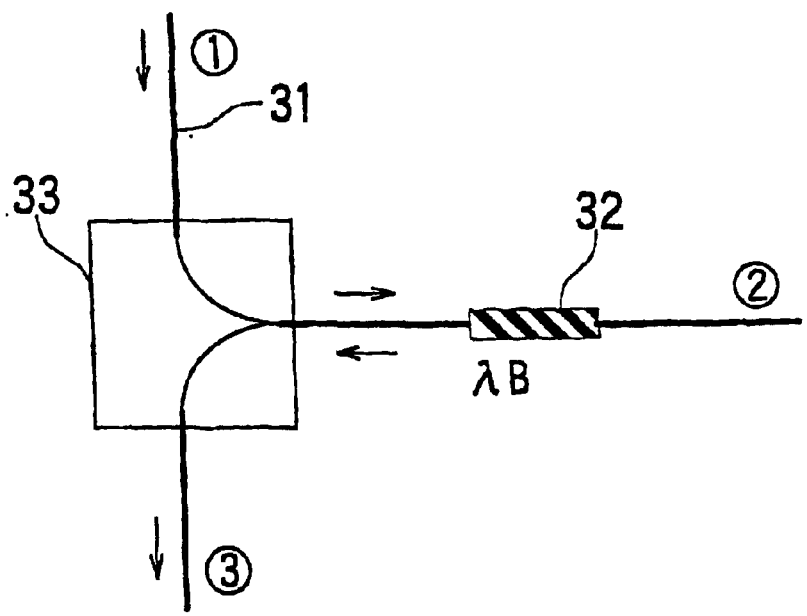
FIG. 10 is a schematic view showing an example of an optical filter combined with a conventional optical circulator.
Figure 11:
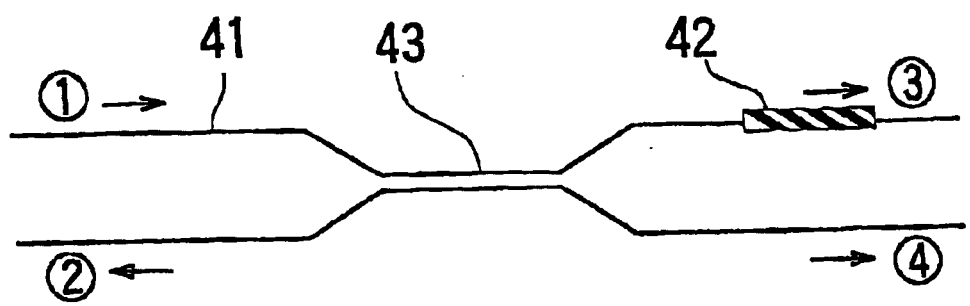
FIG. 11 is a schematic view showing an example of an optical filter combined with a conventional fiber coupler.
Figure 12:
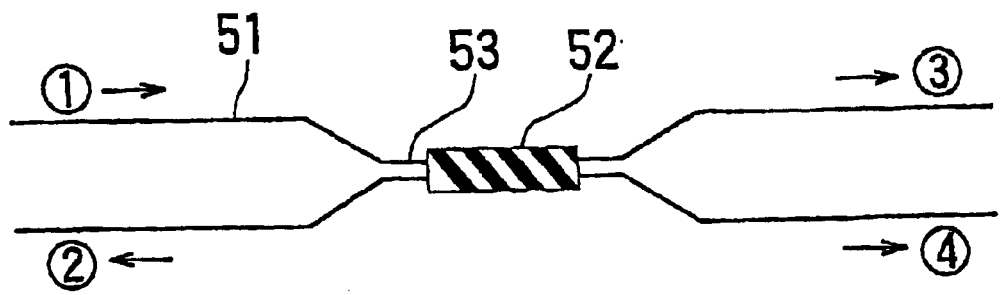
FIG. 12 is a schematic view showing an example of an optical filter formed a grating at a melted-and-extended portion of a conventional optical fiber coupler.
Figure 13:
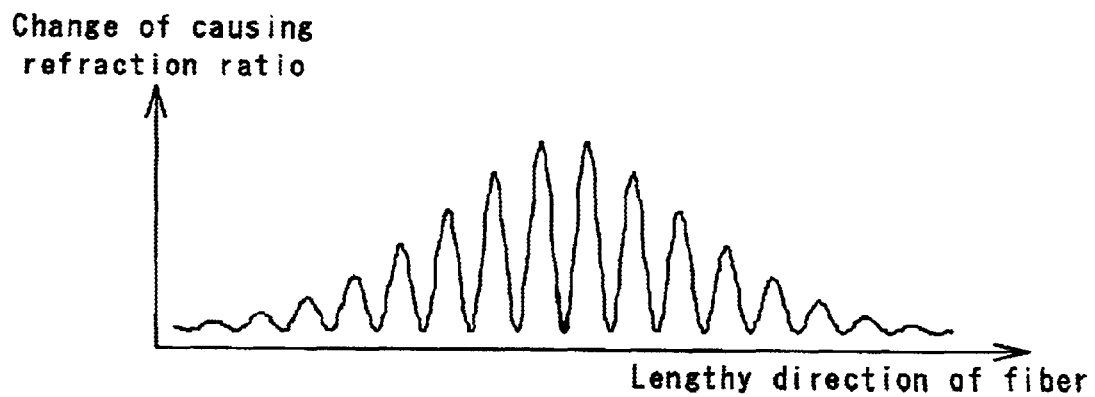
FIG. 13 is a schematic view showing an apodization in an optical fiber grating filter in another embodiment of the present invention.

When the extension ratio is 0.1 and a taper has a length of 20.5 mm, the output efficiency of Bragg wavelength to the port 2 is 67.6%, and output efficiency of excitation light wavelength to the port 3 is 99.9%. At this time, the output properties to the port 3 of 0.98 μm is shown in FIG. 6, the output property to the port 2 of 1.545 μm is shown in FIG. 7.

In result, by changing the form of the taper of coupler, the excitation light for optical amplification is removed up to about 100%, and it is enabled to combine or divide the signal light corresponding to Bragg wavelength out of the signal light amplified.

According to the present invention, as stated above, a multiplexer includes an optical coupler of the grating built-in type and optical amplifier and [has] effects not only multiplex separation of a signal but the function to add a specific wavelength. Accordingly, the excitation light that is unnecessary can be removed effectively and the signal light insertion loss is minimized. Furthermore, since the device does not use the optical parts including the above-mentioned optical circulator and is altogether constituted by the optical fiber, transmission is good and an object of the present invention to provide an inexpensive wavelength multiplex transmission system having low insertion loss is achieved.

What is claimed is:

1. An add-drop multiplexer with signal amplification ability comprising:

a first optical coupler, of a grating built-in type, having an input port, a through port, a forward coupled port, and a reverse coupled port;

a first optical amplifier having an input port for receiving a signal and an output port connected to the input port of the first optical coupler;

a second optical coupler, of a grating built-in type, having an input port, a through port not connected to the through port of the first optical coupler, a forward coupled port connected to the forward coupled port of the first optical coupler, and a reverse coupled port connected to the reverse coupled port of the first optical coupler; and a second optical amplifier having an output, and an input connected to the input port of the second optical coupler wherein a Bragg wavelength, output by the reverse coupled port of the first optical coupler and input to the reverse coupled port of the second optical coupler, is outputted by the input port of the second optical coupler and amplified and outputted by the second optical amplifier.

2. The add-drop multiplexer of claim 1, wherein the first and second optical couplers each include a fiber coupler formed with a fiber grating at a melt-extended portion of the fiber coupler, a pitch of the fiber grating has an uniform structure in a length direction, apodization is done, and the fiber grating has a length of 2.0 mm and a change in induced refractive index is 0.001.

3. The add-drop multiplexer of claim 2, further comprising a switch connecting the reverse coupled port of the second optical coupler to the reverse coupled port of the first optical coupler.

4. The add-drop multiplexer of claim 3, wherein the first and second optical couplers have a same Bragg wavelength.

5. The add-drop multiplexer of claim 2, wherein the first and second optical couplers have a same Bragg wavelength.

6. The add-drop multiplexer of claim 1, further comprising a switch connecting the reverse coupled port of the second optical coupler to the reverse coupled port of the first optical coupler.

7. The add-drop multiplexer of claim 6, wherein the first and second optical couplers have a same Bragg wavelength.

8. The add-drop multiplexer of claim 1, wherein the first and second optical couplers have a same Bragg wavelength.

* * * * *